Feb. 25, 1936.  F. C. DYER ET AL  2,031,943
METHOD AND MEANS FOR SEPARATING SEEDS
Filed Sept. 3, 1931
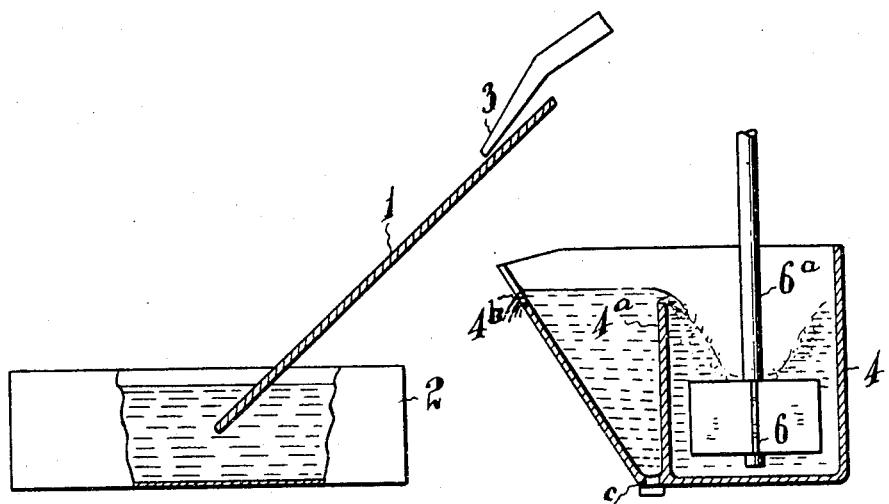
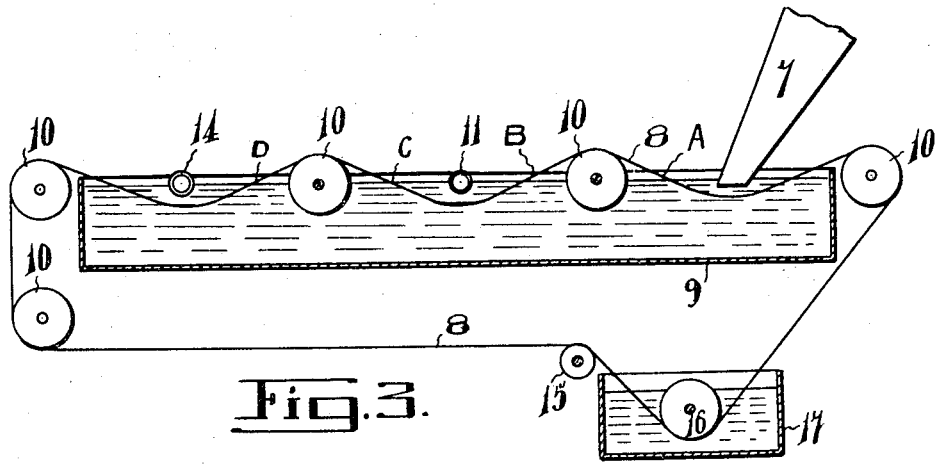
Inventor.
F.C. Dyer + H.L. McClelland

UNITED STATES PATENT OFFICE 2,031,943

METHOD AND MEANS FOR SEPARATING SEEDS

Frederick Charles Dyer and Harold Langdon McClelland, Toronto, Ontario, Canada

Application September 3, 1931, Serial No. 560,962

7 Claims. (Cl. 209—165)

This invention relates to method and apparatus for separating seeds, and in particular for separating weed seeds from grain. Some weed seeds are found mixed with practically all grain and before the grain is usable it is necessary to remove the weed seeds. This has heretofore been chiefly done by means of screens, blowers, centrifuges or sink and float processes, all of which depend on the difference in size, shape or specific gravity of the seeds to be separated. There are, however, certain weed seeds which are of substantially the same size, shape and specific gravity as certain grain seeds with which they are frequently mixed, and which cannot be separated by the above-mentioned methods.

For example the seeds of bladder campion (*Silene latifolia*), night flowering catchfly (*Silene noctiflora*), and white cockle (*Lynchnis alba mill*) are quite near in size, specific gravity and shape to the seeds of clover such as red clover, white clover, crimson clover, sweet clover, alsike and alfalfa. The seeds of the first-mentioned group are, of course, weed seeds and those of the latter are valuable grain or crop seeds, so that the presence of these weed seeds greatly reduces the value and usefulness of the grain.

The object of our invention is, in general, to separate seeds, in particular seeds of similar size, shape, specific gravity, and more particularly to separate weed seeds from grain seeds having these similar physical properties.

We found that some of such seeds differed in the character of their surfaces, in that the surfaces of some varieties were more easily wetted than others, in other words, that there was a difference in wettability. On further experiment it was found that certain weed seeds, in particular those mentioned above, were more wettable than the grain or crop seeds.

Wettability is a phenomenon well known in physical science. It may be defined as the measure of the degree to which liquid will stick to a surface. It must be clearly distinguished from differences in size, shape, density, or specific gravity which may affect the floatability of objects. Wettability is purely a surface action. It is a phenomenon of the outermost layer only.

If two objects have a difference in specific gravity, ordinarily the object having the greatest specific gravity will, if its specific gravity is greater than that of water, sink, while the other object will sink less rapidly or will, if its specific gravity is less than that of water, float. A solid object might sink whereas a porous object in which air is entrapped or a cup shaped object of the same specific gravity would float, the difference in buoyancy in this case being due to a difference in shape which traps air causing the object to float.

None of these phenomena are at all similar to or related to the phenomenon of wettability where objects of the same or substantially the same specific gravity, size, or shape may vary in floatability. It should be made clear that the process of this invention is entirely independent of the characteristics of size, shape, weight, or specific gravity and that by means of it seeds may be separated, which are ordinarily not separable or separable with difficulty, in a liquid by reason of differences in their characteristics other than the difference in wettability. However, it is not necessary that the seeds to be separated should be of similar size, shape, or specific gravity. When the proper difference in surface wettability exists or is produced it is perfectly possible to float the larger seed and allow the smaller to sink, to float the heavier seed and allow the lighter to sink and to float the seed of higher specific gravity and allow the one of lesser specific gravity to sink.

We achieve the object of our invention by taking advantage of this difference in wettability. In the separation of such weed seeds as bladder campion, night flowering catchfly or white cockle from clover seeds, we first condition the seeds, as hereinafter described, and then introduce them in a comparatively thin layer to a water surface. The grain or crop seed floats and the weed seed submerges owing to the difference in the wettability of their surfaces. The seeds must be introduced into the water in such a way that a part of their surfaces is exposed to air, otherwise all will be completely wetted and sink. The conditioning of the seeds prior to their introduction into the water greatly accelerates the separation. If the seeds were not first conditioned practically all would float, although eventually many of the more wettable seeds might sink, but since these seeds may float for days the process is not practical without the preliminary wetting or conditioning, which is therefore an important feature of our invention. The seeds may be conditioned by moistening with water or treating with a reagent, such for example, as oil. Surfaces which resist wetting by water usually have an affinity for oil and vice versa. Oil increases the non-wettability of a surface. Thus to apply oil to the surfaces of the seeds increases the differential of their wettability.

The word "conditioning" as used in the specification and claims hereof means a treatment of the seeds in such a way that the treated seeds will have a difference in wettability of their surfaces not present or present in a lesser degree in the untreated seeds.

There may be a double conditioning process, as for instance a preliminary treatment with oil followed by a wetting in water, or the seeds may be mixed with a mixture of oil and water.

The conditioned seeds may be introduced to the water in a number of ways. For example, the seed may be deposited on an inclined surface and washed into a receptacle by a thin film of water not sufficient to submerge the seeds. The seeds may be placed on a travelling belt which passes into water and thus gradually introduces the seeds into water at the surface thereof. By either of the above methods the seeds are introduced to the surface of the liquid in such a way that momentum of the seeds normal to the surface of the liquid is substantially eliminated. Again, the seeds may be introduced into the water through an agitator, when the less wettable seeds will attach themselves to air bubbles and rise to the surface and the more wettable seeds will sink. Similar results can be obtained by sinking the seeds and mixing them in water and then introducing bubbles into the mixture. Whatever method is used the seeds must be introduced into or mixed with water at its surface, using the word in the broad sense meaning its contact point with air, whether the atmosphere above the water or bubbles beneath it.

Instead of introducing the seeds into water, other liquids or solutions having no prejudicial effect on the seeds may be used, for example alcohol or solutions of salts in water. It may frequently be advisable to use such other liquids, or to treat the water in order to vary its wetting power or to obtain a liquid having a surface tension of the proper strength to support the less wettable seeds and permit the more wettable seeds to sink. By suitable manipulation of the wetting power or the surface tension it is possible to obtain separation where separation was not previously possible or to secure more perfect separation of seeds separable in water having normal surface tension.

Material change of the surface tension may be obtained without measurably changing the density or specific gravity of the liquid.

Instead of introducing the seeds into the liquid in the presence of air, other suitable gases may be used such, for example, as carbon dioxide. If the seeds are introduced into an open bottle of soda water the more floatable seeds will attach themselves to the bubbles of carbon dioxide and rise to the surface. Any gas not harmful to the seeds could be used as the full equivalent of air in the process described.

The seeds may be conditioned by being placed in a mixing machine containing water or a mixture of oil and water. Various kinds of oils may be used including paraffin oil and corn oil. Other reagents, as mentioned above, may be used and many different proportions of seeds and reagents may be used, but in general the use of too much reagent or conditioning for too long a time tends to spoil the effect since the surfaces of all the seeds tend to acquire an equal coating of oil or otherwise acquire the same surface characteristics as the result of a too prolonged conditioning process.

Our invention is hereinafter more particularly described and apparatus for carrying out the same is illustrated in the accompanying drawing in which Fig. 1 is a diagrammatic illustration of one method of introducing the seed into water;

Fig. 2 a diagrammatic illustration of another method;

Fig. 3 a diagrammatic illustration of still another method; and

Fig. 4 a cross section of the view shown in Fig. 3.

In the drawing like numerals of reference indicate corresponding parts in the different figures.

In Fig. 1 the seed, the surface of which has preferably been first wetted or conditioned with oil or other reagents, is deposited on an inclined surface 1 which at its lower end is submerged in water in the receptacle 2. Water from a nozzle 3 is run over the inclined surface 1 in a film of water not sufficiently deep to submerge the seeds which are washed down the incline to the water. The more wettable seeds sink beneath the water in the receptacle, while the less wettable seeds float and are skimmed off the water.

In Fig. 2 the seed is either mixed in the liquid in the receptacle 4 or, having been previously conditioned, is introduced into this receptacle, which is provided with a paddle 6 mounted on a hollow shaft 6ª operated by suitable means not shown. The paddle beats air from the atmosphere into the water impregnating it with bubbles. The less wettable seeds attach themselves to bubbles and rise to the surface or are carried up to the surface by the agitation. The more wettable seeds remain beneath the surface and sink to the bottom. A wall or baffle 4ª forms a separation chamber at one side of the receptacle 4, and the floating seeds are led off through an overflow 4ᵇ in the side, while the seeds which sink are removed through the opening 4ᶜ at the bottom of the separation chamber.

One method whereby the process can be used commercially is illustrated in Fig. 3. The grain is fed through a hopper 7 to an endless belt 8 below the surface of the water in the receptacle 9. The belt runs on rollers 10 and carries the seed out of the water at A where it is exposed to the atmosphere. The belt then dips beneath the water at B and carries with it the more wettable seeds. The less wettable seeds which float are removed by a jet 11 of water directed from one side of the receptacle 9 at B which causes a current which floats the seeds over the overflow 12 where they are strained off in a strainer 13. The belt passes again out of the water over a roller 10 at C carrying the wettable seeds and some less wettable seeds which may have become wet and sunk. The belt descends in the water again at D, the seeds of less wettability which sank at the first submersion floating and being removed by the jet of water 14, through another overflow and strainer. The belt then emerges and passes over the edge of the receptacle 9, around a roller 10 and returns beneath the receptacle 9 to a roller 10 at the front of the receptacle, from whence the belt passes over the front end of the receptacle and into the water beneath the hopper 7. The wettable seeds which remain on the belt are scraped off or removed by passing the belt through water as it passes beneath the receptacle or in any other suitable matter. In the drawing the belt is shown as passing over a roller 15 and under a roller 16 which is immersed in water in a tank 17. This washes the seeds from the belt into the tank. The submersion of the seeds may be repeated any necessary number of times to secure complete separation of the seeds. The seeds which float can be subjected again to the treatment described in order to remove any wettable seeds which may have floated during the first treatment.

Many other specific methods similar to those described may be used for the introduction of the seeds to the liquid.

The separated seeds may be dried in any suitable drier, preferably by agitation in a draught of warm dry air.

What we claim as our invention is:

1. A method of separating seeds from seeds by utilizing a difference in the wettability of their surfaces as distinguished from differences in specific gravity, size, or shape comprising treating the surfaces of seeds having a difference in surface wettability with a reagent adapted to increase the difference in surface wettability, introducing said seeds to an air-liquid surface in such a way that momentum of the seeds normal to the surface of the liquid is substantially eliminated, and floating the less wettable seeds from the more wettable seeds.

2. A method of separating seeds from seeds by utilizing a difference in the wettability of their surfaces as distinguished from differences in specific gravity, size, or shape comprising treating the surfaces of seeds having a difference in surface wettability, with oil, introducing said seeds to an air-liquid surface in such a way that momentum of the seeds normal to the surface of the liquid is substantially eliminated, and floating the less wettable seeds from the more wettable seeds.

3. A method of separating seeds from seeds by utilizing a difference in the wettability of their surfaces as distinguished from differences in specific gravity, size, or shape comprising treating the surfaces of seeds having a difference in surface wettability with a reagent adapted to increase the difference in surface wettability, introducing said seeds gradually to the surface of a liquid so that momentum of the seeds normal to the surface of the liquid is susbtantially eliminated, and floating the less wettable seeds from the more wettable seeds.

4. A method of separating seeds from seeds by utilizing a difference in the wettability of their surfaces as distinguished from differences in specific gravity, size, or shape comprising treating a liquid to modify its surface tension so that the surface of the liquid will support the less wettable seeds and permit the more wettable seeds to sink, introducing seeds having a difference in wettability to an air-liquid surface of such treated liquid in such a way that momentum of the seeds normal to the surface of the liquid is substantially eliminated, and floating the less wettable seeds from the more wettable seeds.

5. A method of separating seeds from seeds by utilizing a difference in the wettability of their surfaces as distinguished from differences in specific gravity, size, shape or absorptive powers comprising treating a liquid to modify its surface tension so that the surface of the liquid will support the less wettable seeds and permit the more wettable seeds to sink, treating the surfaces of seeds having a difference in surface wettability with a reagent adapted to increase the difference in surface wettability, introducing said seeds to an air-liquid surface of such treated liquid in such a way that momentum of the seeds normal to the surface of the liquid is substantially eliminated, and floating the less wettable seeds from the more wettable seeds.

6. A method of separating seeds from seeds by utilizing a difference in the wettability of their surfaces as distinguished from differences in specific gravity, size, or shape comprising treating the surfaces of seeds having a difference in surface wettability, with water exposing the surfaces of said seeds to air, introducing said seeds to an air-liquid surface in such a way that momentum of the seeds normal to the surface of the liquid is substantially eliminated, and floating without agitation the less wettable seeds from the more wettable seeds.

7. A method of separating seeds from seeds by utilizing a difference in the wettability of their surfaces as distinguished from differences in specific gravity, size, or shape comprising treating the surfaces of seeds having a difference in surface wettability with a reagent adapted to increase the difference in surface wettability, exposing the surfaces of said seeds to air, introducing said seeds to an air-liquid surface in such a way that momentum of the seeds normal to the surface of the liquid is substantially eliminated, and floating the less wettable seeds from the more wettable seeds.

FREDERICK C. DYER.
HAROLD L. McCLELLAND.